(12) United States Patent
Rosenwinkel et al.

(10) Patent No.: US 8,837,782 B1
(45) Date of Patent: Sep. 16, 2014

(54) GEOPOSITION DETERMINATION USING SATELLITE EPHEMERIDES

(75) Inventors: Alan M. Rosenwinkel, Maple Shade, NJ (US); Jonathan Mercurio, Morrestown, NJ (US); Kellie Bucha, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 286 days.

(21) Appl. No.: 12/986,661

(22) Filed: Jan. 7, 2011

Related U.S. Application Data

(60) Provisional application No. 61/357,130, filed on Jun. 22, 2010.

(51) Int. Cl.
*G06K 9/00* (2006.01)

(52) U.S. Cl.
USPC .......................................... 382/106; 701/500

(58) Field of Classification Search
None
See application file for complete search history.

(56) References Cited

U.S. PATENT DOCUMENTS

| | | | | |
|---|---|---|---|---|
| 3,781,114 A * | 12/1973 | Marsh et al. | ............. | 356/139.02 |
| 4,621,329 A * | 11/1986 | Jacob | ............................ | 701/513 |
| 4,746,976 A * | 5/1988 | Kamel et al. | .................. | 348/116 |
| 5,109,346 A * | 4/1992 | Wertz | .............................. | 701/13 |
| 5,206,499 A * | 4/1993 | Mantravadi et al. | ........ | 250/203.6 |
| 5,412,574 A * | 5/1995 | Bender et al. | ................. | 701/513 |
| 5,696,578 A * | 12/1997 | Ishida et al. | ................. | 356/28.5 |
| 6,012,000 A * | 1/2000 | Holmes et al. | .................. | 701/13 |
| 6,111,780 A * | 8/2000 | Bertin | ............................. | 365/154 |
| 6,266,616 B1 * | 7/2001 | Needelman | ..................... | 701/513 |
| 6,523,786 B2 * | 2/2003 | Yoshikawa et al. | ........... | 244/171 |
| 6,757,445 B1 * | 6/2004 | Knopp | .......................... | 382/285 |
| 6,950,139 B2 * | 9/2005 | Fujinawa | ....................... | 348/335 |
| 7,447,591 B2 | 11/2008 | Belenkii et al. | | |
| 7,451,022 B1 | 11/2008 | Luk-Paszyc et al. | | |
| 7,786,925 B1 * | 8/2010 | Knibbe et al. | ................... | 342/52 |
| 7,982,951 B1 * | 7/2011 | Innes et al. | ..................... | 359/430 |
| 2003/0044077 A1 * | 3/2003 | Okada | ............................ | 382/239 |
| 2004/0140962 A1 * | 7/2004 | Wang et al. | .................... | 345/179 |
| 2005/0071055 A1 | 3/2005 | Needelman et al. | | |
| 2006/0140494 A1 * | 6/2006 | Ishikawa | ........................ | 382/239 |
| 2007/0010965 A1 * | 1/2007 | Malchi et al. | .................. | 702/151 |
| 2007/0038374 A1 * | 2/2007 | Belenkii et al. | ............... | 701/222 |
| 2009/0177398 A1 | 7/2009 | Belenkii et al. | | |
| 2011/0149060 A1 * | 6/2011 | Jiang et al. | ....................... | 348/77 |

OTHER PUBLICATIONS

Gubler, J. et al, "Differential Atmospheric Refraction and Limitations on the Relative Astrometric Accuracy of Large Telescopes", Publications of the Astronomical Society of the Pacific, 110:738-746, Jun. 1998.

(Continued)

*Primary Examiner* — Nancy Bitar
(74) *Attorney, Agent, or Firm* — Howard IP Law Group, PC

(57) ABSTRACT

Data or electrooptic sensor (EOS) images are made of a star field and at least one, and possibly multiple, Earth satellites associated therewith. Calculations performed on the imaged locations of a satellite and two stars of a star field provide all the information needed to identify the observer's position. When the ephemerides of the satellite(s) are less accurately known, calculations performed on the imaged locations of at least two satellites and four stars of a star field provide all the information needed to identify the observer's position, because the along-track and cross-track ephemerides errors are different. Thus, the cross-track information of multiple satellites is preferentially used to determine the geolocation.

22 Claims, 14 Drawing Sheets

(56) References Cited

OTHER PUBLICATIONS

Murtagh, F., "A New Approach to Point-Pattern Matching", Publications of the Astronomical Society of the Pacific, 104: 301-307, Apr. 1992.

Ruiz, A., "Navigational Algorithms—Celestial Fix 2 LoP analytic solution", http://www.geocities.com/andresruizgonzalez Feb. 2009.

U.S. Appl. No. 12/917,012, filed Nov. 1, 2010 entitled "Geoposition Determination from Star and Satellite Observations", in the name of Rosenwinkel, et al.

U.S. Appl. No. 12/732,809, filed Mar. 26, 2010 entitled "Geoposition Determination by Starlight Refraction Measurement", in the name of Rosenwinkel.

Thomas, M. E., et al, "Astronomical Refraction", Johns Hopkins Apl Technical Digest, vol. 17, No. 3 (1996), pp. 279-284.

Liping, Z., et al, "Autonomous Orbit Determination for Earth Satellites by Starlight Atmospheric Refraction", College of Astronautics, Northwestern Polytechnical University, Xi'an, China, Apr. 2002.

Vittitoe, C.N., et al, "Analytic Fit of Deviation Caused by Atmospheric Refraction of Starlight as a Function of Space-Based Sensor Position", for Poster Session at the 1997 Infrared Information Symposia Specialty Group on Targets, Backgrounds and Discrimination Space Surveillance, Johns Hopkins University Appied Physics Laboratory, Laurel, Maryland, Jun. 4-5, 1997.

"Stellar Aberration", http:/.www.mathpages.com/rr/s2-05/2-05.htm, Sep. 8, 2009, pp. 1-13.

"The Celestial Sphere: How do astronomers keep track of the sky when the earth is constantly moving?", http://www.astro.cornell.edu/academics/courses/astro201/cel_sphere.htm, pp. 1-2, Sep. Fall 2011.

"The Celestial Sphere", http://csep10.phys.utk.edu/astr161/lect/celestial/celestial.html, pp. 1-3, Sep. Fall 2011.

Mangum, J., "Atmospheric Refractive Signal Bending and Propagation Delay", pp. 1-27, Jun. 21, 2011.

"Astronomical Information Sheet No. 66", prepared by HM Nautical Almanac Office, The United Kingdom Hydrographic Office, Crown Copyright 2007.

\* cited by examiner

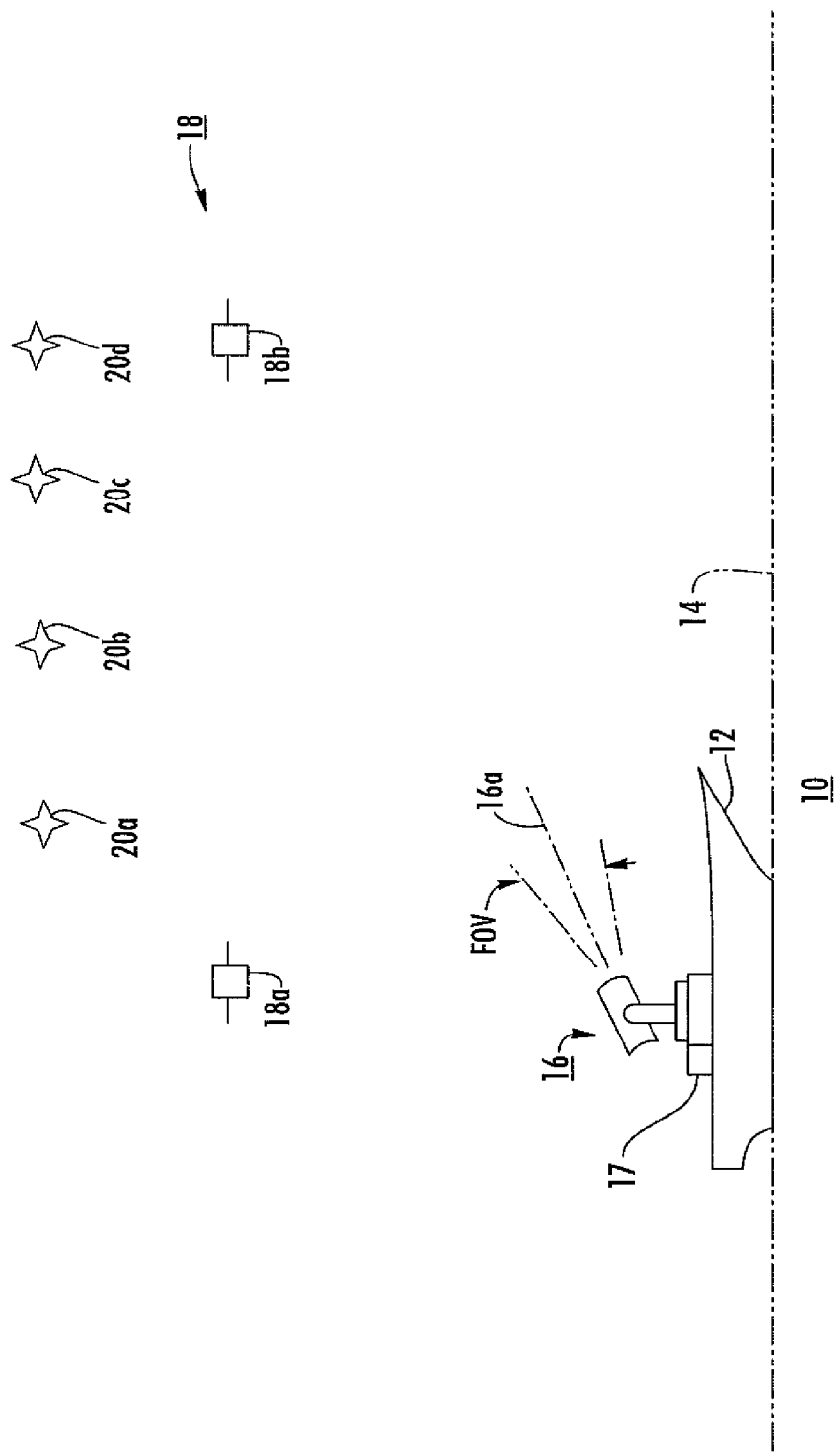

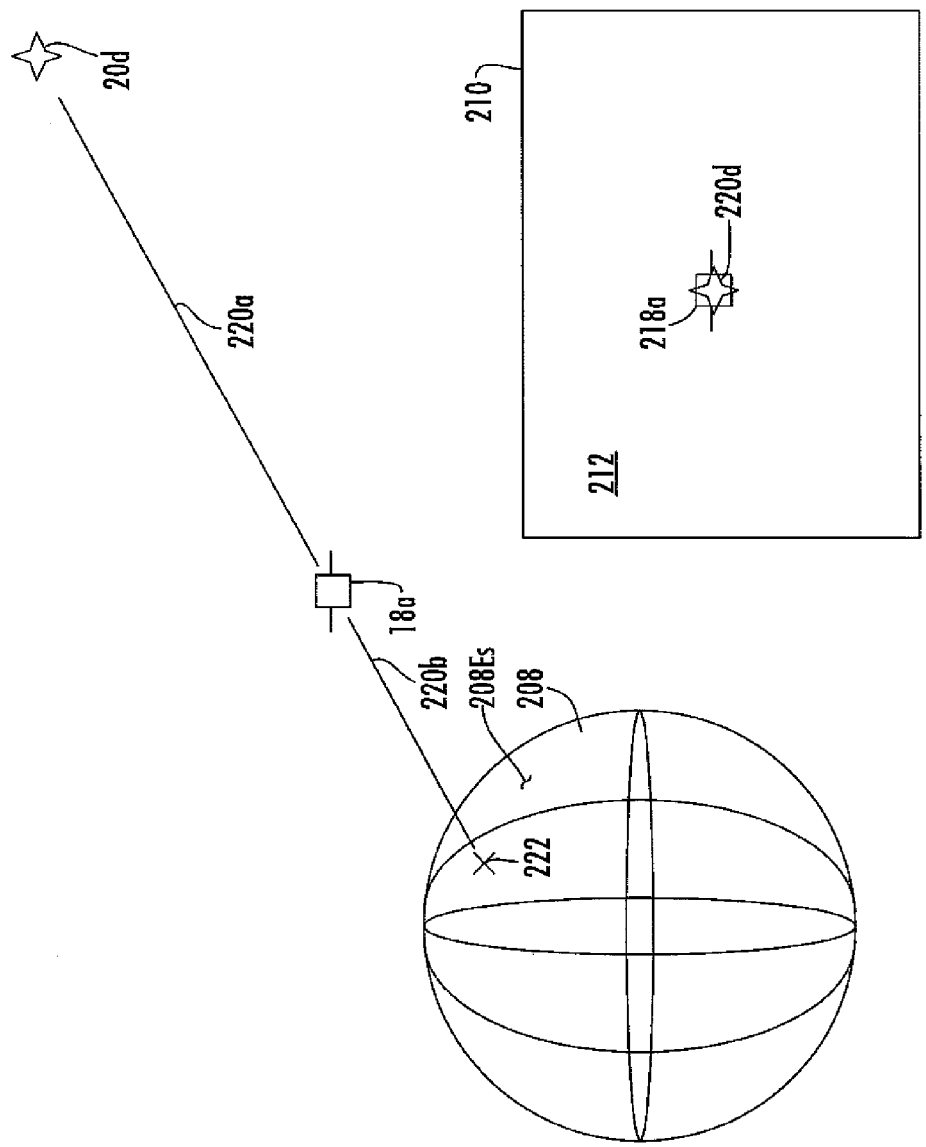

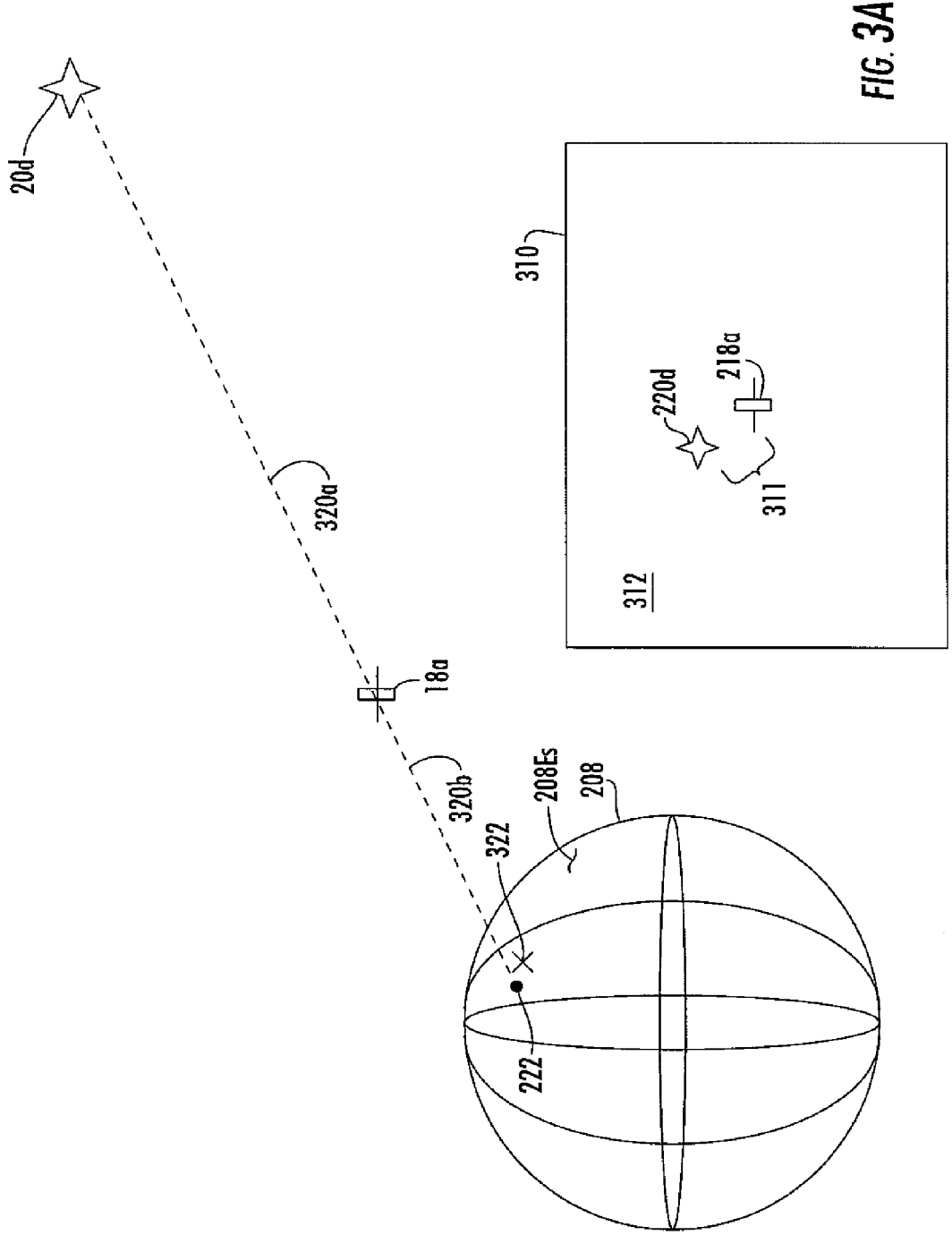

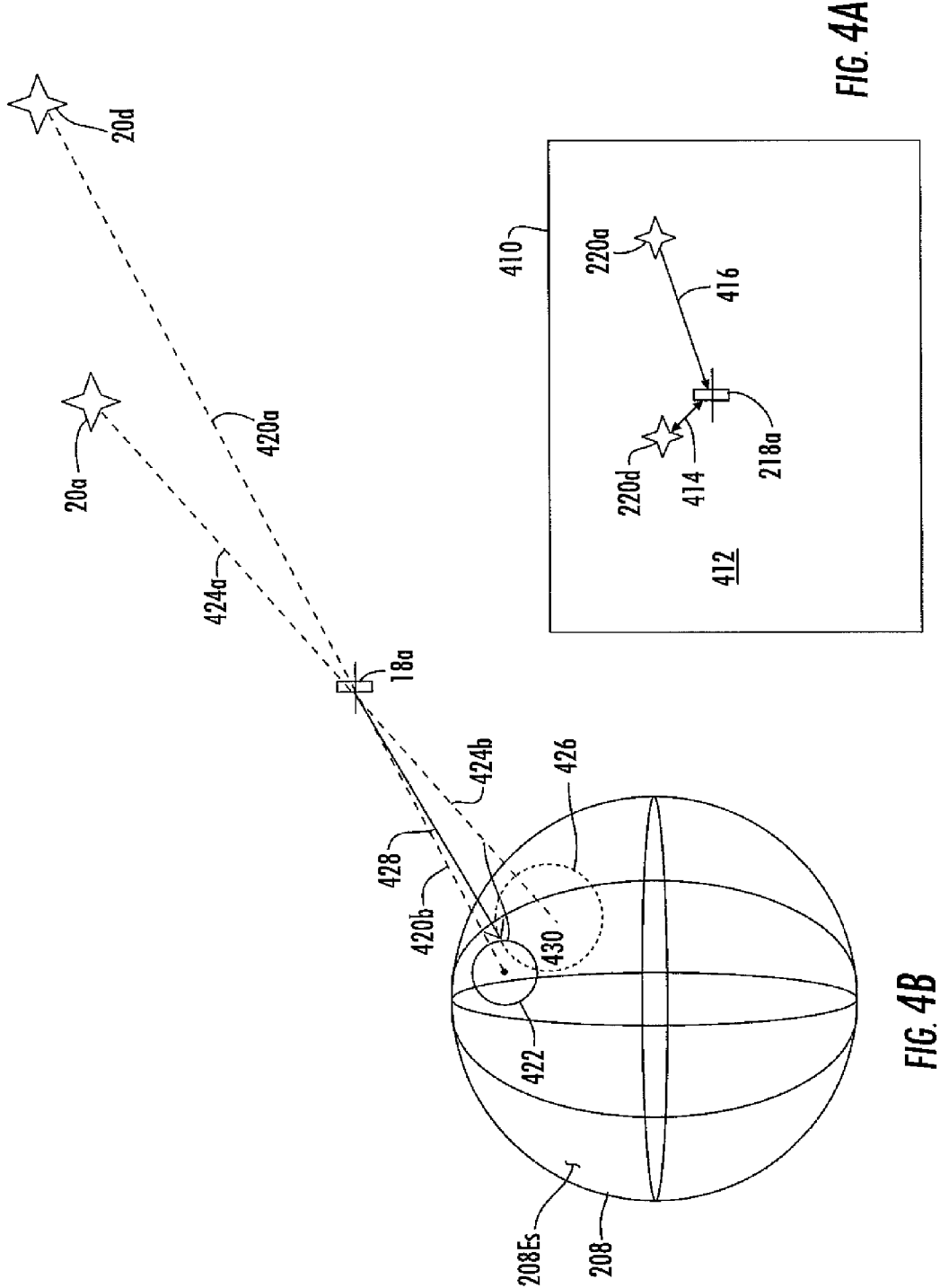

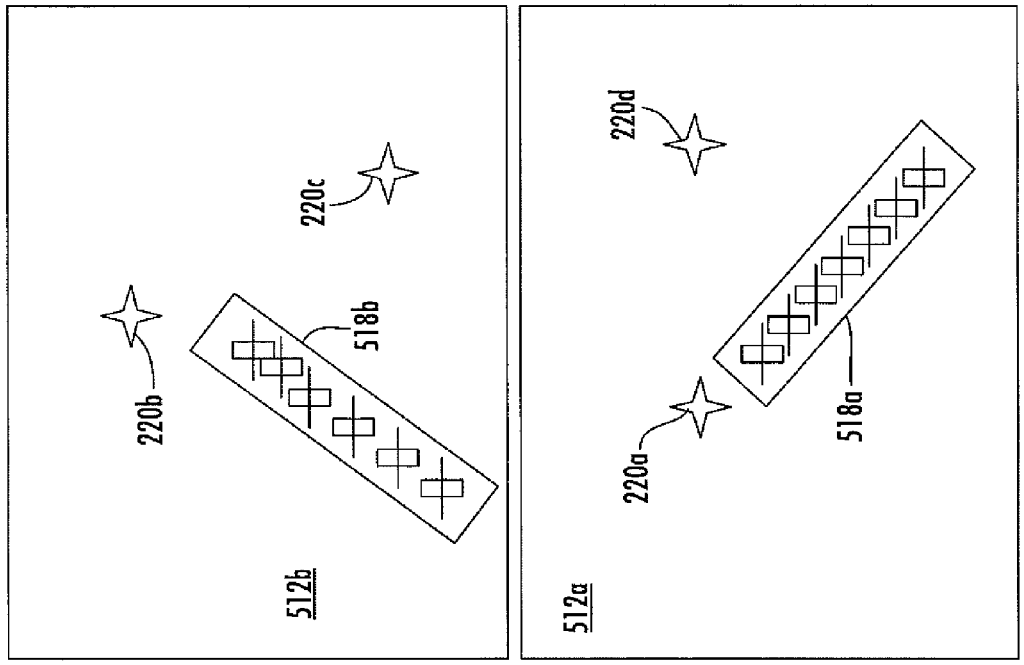
FIG. 5C
FIG. 5E
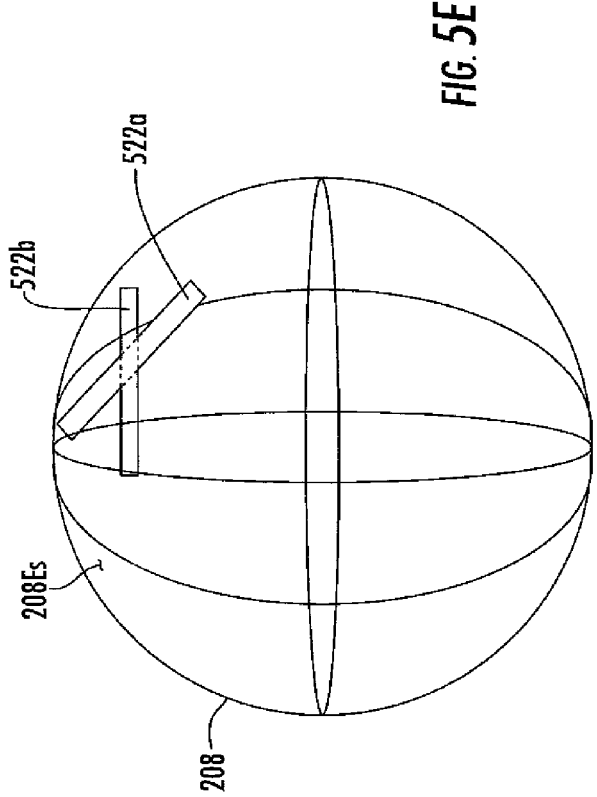
FIG. 5D

CREATING STAR VECTORS IN CAMERA FRAME FROM SINGLE IMAGE OR BY SYNTHETIC SKY IMAGE IF NEEDED

100   START

110   $S_1^{CAM} = [sin(x_1 P_x) \; cos(y_1 P_y) \quad cos(x_1 P_x) \; cos(y_1 P_y) \quad sin(y_1 P_y)]$ 120   $S_2^{CAM} = [sin(x_2 P_x) \; cos(y_2 P_y) \quad cos(x_2 P_x) \; cos(y_2 P_y) \quad sin(y_2 P_y)]$ 130   $U^{CAM} = [sin(x_U P_x) \; cos(y_U P_y) \quad cos(x_U P_x) \; cos(y_U P_y) \quad sin(y_U P_y)]$ 150   IF IMAGES USED IN STEPS 110, 120 AND 130 ARE DIFFERENT IMAGES (POTENTIALLY TAKEN AT DIFFERENT TIMES) TRANSLATE AND ROTATE $S_1^{CAM}, S_2^{CAM}, U^{CAM}$ TO CORRESPOND TO COMMON COORDINATE FRAME FIXED IN TIME AT TIME $t_D$

160   GO TO 250 OR 322 DEPENDING ON ACCURACY OF SATELLITE EPHEMERIDES $x_i$   IS THE x-AXIS LOCATION IN THE CAMERA FRAME OF THE $i^{th}$ OBJECT IN PIXELS $P_x$   IS THE RADIANS/PIXEL ALONG THE x-AXIS OF THE CAMERA $P_y$   IS THE RADIANS/PIXEL ALONG THE y-AXIS OF THE CAMERA $S_i^{CAM}$   IS THE VECTOR TO THE $i^{th}$ STAR IN THE CAMERA FRAME $U^{CAM}$   IS THE VECTOR TO A SATELLITE IN THE CAMERA FRAME

FIG. 6H

MATH FOR CALCULATION POSITION FROM TWO SKY IMAGES OR TWO SYNTETIC SKY IMAGES WITH INACCURATE ALONG-TRACK EPHEMERIDES

322 START

323 PERFORM STEPS 100-290 FOR FIRST SYNTHETIC SKY IMAGE SUCH THAT
$X_1^{ECEF}(\alpha) = U_1^{ECEF}(t_o + \alpha) - C_1(\alpha) U_1^{ECEF}$ from Ship
where $\alpha \in \mathcal{R}^1$ 324 PERFORM STEPS 200-290 FOR SECOND SYNTHETIC SKY IMAGE SUCH THAT
$X_2^{ECEF}(\beta) = U_2^{ECEF}(t_o + \beta) - C_2(\beta) U_2^{ECEF}$ from Ship,
where $\beta \in \mathcal{R}^1$ 330 $Altitude(X_2^{ECEF}(\beta)) = Altitude(X_1^{ECEF}(\alpha)) = 0$ 350 SOLVE 323,324,330 FOR $\tau_1 \in \mathcal{R}^1$ AND $\tau_2 \in \mathcal{R}^1$ SUCH THAT $X_1^{ECEF}(\tau_1) X_2^{ECEF}(\tau_2)$

360 END

FIG. 6I

MATH FOR CALCULATING POSITION FROM A SINGLE SKY IMAGE OR SINGLE SYNTETIC SKY IMAGE WITH ACCURATE EPHEMERIDES

250    $M^{ECEC} = [S_1^{ECEF} \quad S_2^{ECEF} \times S_2^{ECEF} \quad S_1^{ECEF} \times (S_1^{ECEF} \times S_2^{ECEF})]$ WHERE $S_1^{ECEF}$ AND $S_2^{ECEF}$ ARE VECTORS TO STARS FROM THE CENTER OF THE EARTH AND ARE KNOWN FOR A GIVEN TIME FROM STAR TABLES.

260    $M^{CAM} = [S_1^{CAM} \quad S_1^{CAM} \times S_2^{CAM} \quad S_1^{CAM} \times (S_1^{CAM} \times S_2^{CAM})]$

270    $M_{CAM}^{ECEF} = (M^{ECEF})(M^{CAM})^T$

280    $M_{from\;Ship}^{ECEF} = R_{CAM}^{ECEF} U^{CAM}$

290    $X^{ECEF} = U^{ECEF} - CU_{from\;Ship}^{ECEF}$

300    SOLVE FOR $y \in C$ SUCH THAT Altitude $(X^{ECEF}) = 0$

305    SUBSTITUTE $C = y$ INTO 290 TO GIVE $X^{ECEF} = U^{ECEF} - [y_{from\;Ship}^{ECEF}]$

310    END $R_{CAM}^{ECEF}$ IS THE ROTATION MATRIX FROM THE CAMERA FRAME TO ECEF $X^{ECEF}$ IS THE POSITION OF THE OBSERVER AT THE TIME THE CAMERA IMAGE WAS TAKEN $U^{ECEF}$ IS THE VECTOR TO THE SATELITE FROM THE EARTH WHICH IS KNOWN FOR A GIVEN TIME FROM SATELLITE EPHEMERIDES.

$$(U \times V)_i = \frac{U_j V_p S_{ijk}}{U_m V_n \varepsilon_{imn} U_p V_q \varepsilon_{ipq}}$$

FIG. 8

GEOPOSITION DETERMINATION USING SATELLITE EPHEMERIDES

This application claims the benefit of the priority date of Provisional application 61/357,130 filed Jun. 22, 2010 in the name of Rosenwinkel et al., the entire disclosure of which is incorporated herein by reference.

This invention was made with Government Support under Contract No. N00024-03-C-6110 awarded by the Department of the Navy. The Government has certain rights in this invention.

BACKGROUND

Determining the geoposition of a movable or moving platform is a centuries-old problem. The geoposition of a vehicle or observer can be defined as the vector from the observer's vehicle to the Earth in Earth-Centered-Earth-Fixed coordinate frame. This geoposition problem was solved in the past by the use of the slight reduction method, which involves incorporation of star altitudes from the horizon to compute lines of positions, the intersections of which define the estimate of the position of the vehicle or observer. The altitudes of the stars relative to the horizon can be determined by the use of a sextant. This sight reduction method requires either visual measurement of the horizon or inertial measurement of the local gravity vector as a benchmark for all star observations. The visual observation of the horizon is subject to error due to obstructions, haze and vehicle motion, and determination of the local gravity vector is rendered inaccurate due to inability to distinguish local gravity from acceleration.

Position of a movable platform can also be determined by dead reckoning, where measurements of angular rotation rates and translational accelerations, using gyroscopes and accelerometers, are integrated into the calculated position. The dead reckoning technique is, generally speaking, only useful for short periods of navigation, as the measurements of rotation rates and acceleration are subject to unavoidable drift errors. The drift errors cumulate with time.

Position of a movable vehicle has also been calculated by triangulating from three or four Earth satellite position measurements. This method has the disadvantage that it is dependent upon absolute knowledge of the positions of the satellites. The orbits of the satellites are affected or perturbed by factors including atmospheric drag and solar winds. While the orbital position can be corrected by periodic position update information derived from ground-based observations, that information is liable to be old at the time that it is applied, which reduces its usefulness for accurate geoposition determination. This, in turn, may result in an error of many kilometers in the geoposition so determined.

A common method for geolocation of a moving vehicle is by use of the Global Positioning System (GPS). The GPS is very effective, but cannot be relied upon because of the danger of outage, such as might be caused by jamming or outright destruction. Consequently, it is desirable to have a technique for accurate geoposition determination without the use of GPS.

United States patent application 2009/0177398 A1, published Jul. 9, 2009 in the name of Belenkii et al. describes an aircraft navigation system with an inertial measurement unit (IMU) and an optical sensor which periodically updates the IMU to compensate for gyroscope and accelerometer drift. As with the case of triangulation, the possibility of inaccurate satellite ephemerides may lead to limited geoposition accuracy.

Improved and/or alternative geoposition determination techniques are desired.

SUMMARY

A method and system according to an aspect of the disclosure is for geoposition determination in the presence of at least two Earth satellites. The method and system observes the x and y positions in a first image of a first satellite and two stars, and observes the x and y positions in a second image of a second satellite and two stars. Ideally, the stars of the second image are different from the stars of the first image. From the first image a line, curve, or a first set of possible locations of the observer in three-dimensional space is determined. From the second image, a second line, curve, or set of possible locations of the observer in three-dimensional space is determined. The observer's location is deemed to be at the intersection of the first and second sets of possible locations.

A method and system according to another aspect of the disclosure is for geoposition determination in the presence of at least first and second Earth satellites and at least first and second stars. The method and system according to this aspect of the disclosure observes the satellites and the stars with an imager, to produce a plurality of images, each of which images contains the image of at least one of the first and second satellites or one of the stars. Some of the images may contain both satellites and plural stars. From the x and y coordinates of the satellites and the stars in the images, a determination is made of the azimuth and elevation of the satellites and the stars at the observer's location. The azimuth and elevation of the satellites and the stars are converted to a common or local coordinate system fixed in time, to produce first and second synthetic sky images, each of which synthetic sky images includes at least two stars and one satellite. A determination is made from the first and second synthetic sky images of first and second sets of possible locations of the observer in three-dimensional space. This forms a set of intersecting lines. The intersection of the first and second sets of possible locations is deemed to be the location of the observer.

A method and system for geoposition determination in the presence of at least two Earth satellites according to an aspect of the disclosure includes observing the x and y positions of a first satellite and at least a first star in a first image, and converting the x and y positions of the first satellite and the first star in the first image to azimuth and elevation at the observer's location. The method and system further includes observing the x and y positions of a second star in a second image, and converting the x and y positions of the second star in the second image to azimuth and elevation at the observer's location. The motion of the observer in a first interval is determined. The first interval extends between the observing of the first satellite and the first star and the observing of the second star. A first synthetic sky image is generated from the motion of the observer during the first interval and from the azimuth and elevation of the first satellite, the first star and the second star. The x and y positions of a second satellite and at least a third star in a third image are observed, and the x and y positions of the second satellite and the third star in the third image are converted to azimuth and elevation at the observer's location. The x and y positions of a fourth star in a fourth image are observed. The x and y positions of the fourth star in the fourth image are converted to azimuth and elevation at the observer's location. The motion of the observer in a second interval is determined. The second interval lies between the observing of the second satellite and the third star and the observing of the fourth star. A second synthetic sky image is generated from the motion of the observer during the second interval and from the azimuth and elevation of the second satellite, the third star and the fourth star. A first set of possible locations of the observer in three-dimensional space is determined from the first synthetic sky image. This first set of possible locations may be viewed as defining a curved line. A second set of possible locations of the observer in three-dimensional space is determined from the second synthetic sky image. The intersection of the first and second sets of possible locations is deemed to be the location of the observer at the time the first image is taken.

BRIEF DESCRIPTION OF THE DRAWINGS

FIG. 1 illustrates a scenario including a vehicle in the form of a ship with a telescope, electrooptic device or electrooptic sensor (EOD or EOS), a plurality of Earth satellites, and a star field;

FIG. 2A is a notional representation of a possible image in the field of view of an EOS such as that of FIG. 1, in which a star image and a satellite image are superposed, and FIG. 2B is a perspective or isometric view of the alignment of a star, a satellite, and the Earth's surface in the case of the image of FIG. 2A;

FIG. 3A is a notional representation of a possible image in the field of view of an EOS such as that of FIG. 1 in which a star image and a satellite image are separated in the plane of the EOS, and FIG. 3B is a perspective or isometric view of the alignment of a star, a satellite, and the Earth's surface in the case of the image of FIG. 3A;

FIG. 4A illustrates a possible image in the field of view of the EOS of FIG. 1 in which two star images and a satellite image are mutually separated, and FIG. 4B is a perspective or isometric view of the alignment of the two stars, a satellite, and the Earth's surface in the case of the image of FIG. 4A;

FIG. 5C illustrates a possible image in the field of view of an EOS such as that of FIG. 1 in which two star images and a range encompassing the errors in the low-accuracy ephemerides of a satellite in the along-track direction, where the satellite motion includes a component orthogonal to that of the satellite of FIG. 5A, and FIG. 5D illustrates the superposed error tracks showing how the geolocation is established, FIG. 5E is a reproduction of the image depicted in FIG. 5A to help illustrate the overlap with the images of FIG. 5C;

FIG. 8 is a simplified logic flow chart or diagram illustrating steps, including computer steps, according to aspects of the disclosure, for processing satellite and star image information from multiple satellite and star sightings to determine the geolocation of the observer.

DETAILED DESCRIPTION

Figure 5A:
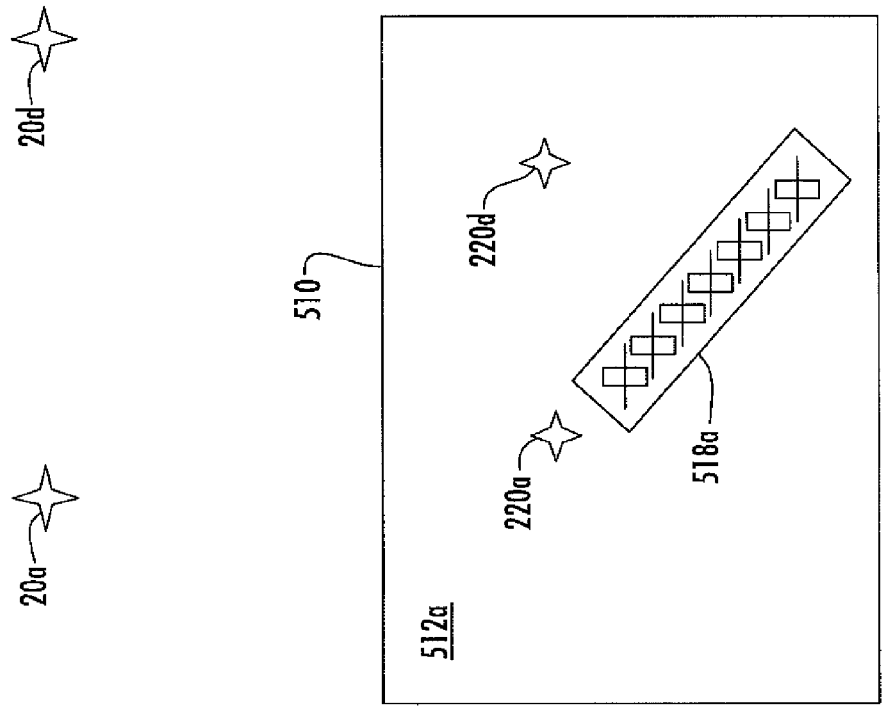
FIG. 5A illustrates a possible image in the field of view of an EOS such as that of FIG. 1 in which two star images and a "smear" represents the low-accuracy ephemerides of a satellite in the along-track direction.

Satellite ephemerides error is predominantly along-track (collinear with satellite velocity), and the errors off-track (perpendicular to the satellite velocity) are much less. According to one mode of a method according to an aspect of the disclosure, an observer, telescope, electro-optical device or electro-optical sensor (hereinafter EOS) fixed to an inertially stabilized trainable mount on the vehicle is used to make (take) two or more images. At least some of the images include a satellite or at least one star, and preferably a satellite and two or more stars. For nominal exposure times, the satellite may appear as a smeared "streak" line in the EOS or camera image, and the star(s) are unsmeared in the background. The position of the satellite relative to the stars and its direction of motion in the stabilized camera coordinate frame are determined from the camera image. This determination is made by calculations that are sensitive only to pixel-to-pixel relative bias, noise, and off-track satellite ephemerides error. The determination of satellite position and direction of motion is independent of other system errors such as refraction, vehicle or ship geoposition, camera or EOS alignment and orientation, and satellite on-track position error.

FIG. 1 is a simplified diagram illustrating a scenario 10 in which a vehicle illustrated as a ship 12 moves on the surface 14 of a sea. An electrooptical device or electrooptic sensor (EOD or EOS) illustrated as a telescope 16 is mounted for azimuth and elevation motion. The field of view (FOV) of the telescope is illustrated by dash-dot lines about an axis 16a. The telescope/EOD/EOS images the field of view to form an image in a focal plane, much as a camera does. FIG. 1 also illustrates two satellites 18a and 18b of a satellite field designated generally as 18, and a plurality of stars 20a, 20b, 20c, and 20d of a star field designated generally as 20. Stars 20a, 20b, 20c, and 20d and satellites 18a and 18b are visible from ship 12. Ship 12 carries a computer 17 by which calculations based on measurements made by telescope/EOD/EOS 16 may be made for geolocation.

Theoretically, if a satellite and a star appear at the same location in the image of telescope/EOD/EOS 16 of FIG. 1, the vector extending from the star to the satellite is collinear or co-linear with the vector from the satellite to the "observer" viewing the image of the telescope/EOD/EOS. FIG. 2A is a simplified or notional representation of the image 212 appearing in or on an image plane or focal plane 210 of the telescope/EOD/EOS 16 under this condition. In FIG. 2A, the image 212 includes the image 218a of satellite 18a of FIG. 1 superposed over the image 220d of a star 20d of star field 20 of FIG. 1. Depending upon the duration of the image-making interval, the position of the satellite 218a in the image 210 may be streaked due to motion of the satellite. This streaking is not important to geolocation according to aspects of the disclosure. FIG. 2B is a simplified perspective or isometric representation of the physical situation corresponding to the image 212 of FIG. 2A. In FIG. 2B, a line portion 220a extending from star 20d to satellite 18a is collinear with a line portion 220b extending from the satellite 18a to the surface 208Es of Earth 208. The intersection 222 of the line segment 220b with Earth surface 208Es defines the observer's geoposition at shadow point 222.

FIG. 3A is a notional representation of a telescope/EOD/EOS image field-of-view or focal plane 310 illustrating a scene 312 including image 218a of satellite 18a of FIG. 1 and an image 220d of star 20d of star field 20 of FIG. 1. The positions of the satellite 218a and the star 220d are spaced apart in the focal plane 310. FIG. 3B is a perspective or isometric view of the physical situation corresponding to the image 312 of FIG. 3A. In FIG. 3B, a line portion 320a extending from star 20d to satellite 18a is collinear with a line portion 320b extending from the satellite 18a to the surface 208Es of Earth 208. The intersection 322 of the line segment 320b with Earth surface 208Es defines the observer's geoposition or shadow point 322. The offset 311 between the satellite image 218a and the star image 220d corresponds to the angular distance from the observer 322 to the shadow point 222 in FIG. 3B.

FIG. 4A is a notional representation of a telescope/EOD/EOS field-of-view or focal plane 410 illustrating a scene 412 including an image 218a of satellite 18a of FIG. 1 and two stars of a star field 20 of FIG. 1. The two stars are designated 220a and 220d. The angle between star 220a and satellite 218a in image 410 is represented by a line 414, and the angle between star 220d and satellite 218a is represented by a line designated 416. FIG. 4B is a perspective or isometric view of the physical situation corresponding to the image 412 of FIG. 4A. In FIG. 4B, a line portion 420a extending from star 20d to satellite 18a is collinear with a line portion 420b extending from the satellite 18a to the surface 208Es of Earth 208. Line segment 420b traces out an approximately circular intersection 422 with Earth surface 208Es as a function of the direction of offset angle 414. Similarly, a line portion 424a extending from star 20a to satellite 18a is collinear with a line portion 424b extending from satellite 18a to the surface 208Es. Line segment 424b traces out an approximately circular intersection 426 with the surface 208Es as a function of the direction of the offset angle 416. Line 428 extending from satellite 18a to the surface 208Es identifies as a point 430 the location at which the observer's view is that of FIG. 4A.

FIGS. 6H and 8 set forth the mathematical steps required for determination of the observer's geoposition from a single sky image containing at least one satellite and two stars, or from a synthetic sky image including at least a satellite and two stars, where the synthetic sky image is pieced together from multiple images with known angular relationships and exposure times, and where the ephemerides are accurately known. As set forth in FIG. 6H, the method includes starting at step 100, and proceeding to step 110, which represents calculating the vector $S_1^{CAM}$ from the ship to the first star in the telescope/EOD/EOS (camera) coordinate system or coordinate frame $$S_1^{CAM}=[\sin(x_1P_x)\cos(y_1P_y)\cos(x_1P_x)\cos(y_1P_y)\sin(y_1P_y)] \quad (110)$$

where:
$S_1^{CAM}$ is the vector to the 1st star in the camera coordinate frame;
$x_1$ is the x-axis location, in pixels, in the camera focal plane of the 1st star
$y_1$ is the y-axis location, in pixels, in the camera focal plane, of the 1st star;
$P_x$ is the radians/pixel along the x-axis of the camera focal plane;
$P_y$ is the radians/pixel along the y-axis of the camera focal plane.

Step 120 of FIG. 6H represents calculating the vector from the ship to the second star in the camera coordinate frame $$S_2^{CAM}=[\sin(x_2P_x)\cos(y_2P_y)\cos(x_2P_x)\cos(y_2P_y)\sin(y_2P_y)] \quad (120)$$

$S_2^{CAM}$ is the vector to the 2nd star in the camera coordinate frame;
$x_2$ is the x-axis location, in pixels, in the camera focal plane of the 2nd star
$y_2$ is the y-axis location, in pixels, in the camera focal plane, of the 2nd star;

Step 130 represents calculating the vector from the ship to the satellite in the camera coordinate frame $$U^{CAM}[\sin(x_UP_x)\cos(y_UP_y)\cos(x_UP_x)\cos(y_UP_y)\sin(y_UP_y)] \quad (130)$$

where:
$U^{CAM}$ is the vector to a satellite in the camera coordinate frame;
$x_U$ is the x-axis location, in pixels, in the camera focal plane of the satellite;
$y_U$ is the y-axis location, in pixels, in the camera focal plane, of the satellite.

Step 150 of FIG. 6H represents calculating the rotation of the vectors $S_1^{CAM}$, $S_2^{CAM}$, $U^{CAM}$ to correspond to a common coordinate frame fixed in time at time $t_0$. In step 150, the x and y coordinates of the satellites 668a, 668b and the stars 670a, 670d, 670b, 670c in the images are converted to azimuth and elevation of the satellites 18a, 18b and the stars 220 at the observer's location using rotation and translation information. The rotation and translation information may be derived from an inertial navigation system. Thus, the azimuth and elevation of the satellites and the stars are converted in step 150 to a common or local coordinate system fixed in time, to thereby produce first and second synthetic sky images 684 and 690, respectively, each of which synthetic sky images includes at least two stars and one satellite. If high accuracy ephemerides are available, the method continues to step 250 of FIG. 8, else the algorithm continues to step 322 of FIG. 6I.

As set forth in FIG. 8, when high accuracy ephemerides are available, the method includes the step 250 of determining the 3×3 matrix $M^{ECEF}$ representing the orthogonal vector triad of the stars in the earth-centered-earth-fixed (ECEF) frame $$M^{ECEF}=[S_1^{ECEF} S_1^{ECEF} X S_2^{ECEF} S_1^{ECEF} X (S_1^{ECEF} X S_2^{ECEF}] \quad (250)$$

where:
$S_1^{ECEF}$ and $S_2^{ECEF}$ are vectors extending from the center of the Earth to the stars, and which are known from star tables for any given time. The cross product employed here (denoted X) is the normalized cross product, defined as the unit vector in the direction of the conventional cross product (see FIG. 8). FIG. 8 shows the cross product written in the Einstein notation $$(U \times V)_i \equiv \frac{U_j V_k \varepsilon_{ijk}}{U_m V_n \varepsilon_{lmn} U_p V_q \varepsilon_{lpq}}$$

where:
U and V are arbitrary vectors, ε is the Levi-Civita symbol and i, j, k, l, m, n, p, q represent Cartesian coordinates as per the common Eisenstein notation convention.
The method also includes the step 260 of determining the 3×3 matrix $M^{CAM}$ representing the orthogonal vector triad of the stars in the camera coordinate frame $$M^{CAM} = [S_1^{CAM} S_1^{CAM} X S_2^{CAM} S_1^{CAM} X (S_1^{CAM} X S_2^{CAM})] \quad (260)$$

where:
$S_1^{CAM}$ and $S_2^{CAM}$ are vectors from the ship to the stars in the camera coordinate frame. The cross product employed here (denoted X) is the normalized cross product, defined as the unit vector in the direction of the conventional cross product (see FIG. 8)

$$(U \times V)_i \equiv \frac{U_j V_k \varepsilon_{ijk}}{U_m V_n \varepsilon_{lmn} U_p V_q \varepsilon_{lpq}}.$$

The next step in this method is step 270, which determines the 3×3 rotation matrix $R_{CAM}^{ECEF}$ from the camera coordinate frame to the ECEF coordinate frame $$R_{CAM}^{ECEF} = M^{ECEF} (M^{CAM})^T \quad (270)$$

Following step 270, the method includes the determination of the vector $U_{from\ ship}^{ECEF}$ from the observer (the ship) to the from ship satellite in ECEF by $$U_{from\ ship}^{ECEF} = R_{CAM}^{ECEF} U^{CAM} \quad (280)$$

where:
$U^{CAM}$ is the 3×1 vector from the ship to the satellite in the camera coordinate frame.
The vector $X^{ECEF}$ from the center of the Earth to the ship at the time the camera image is or was taken in ECEF is $$X^{ECEF} = U^{ECEF} - C U_{from\ ship}^{ECEF} \quad (290)$$

where:
C is an unknown scalar; and
$U^{ECEF}$ is the vector to the satellite from the Earth center, which is known for a given time from satellite ephemerides.
Step 300 of FIG. 8 solves the equation of step 290 for a scalar value γ such that $$\text{Altitude}(X^{ECEF}(C=\gamma)) = 0 \quad (291),$$

and
Step 305 substitutes C=γ into step 290 to give $$X^{ECEF} = U^{ECEF} - \gamma U_{from\ ship}^{ECEF} \quad (305)$$

where:
γ is the value of C that makes the expression (291) true.
This ends the method of FIG. 8. This method for geoposition determination or navigation may be termed "angles-only." Such navigation or geoposition determination produces results, the accuracy of which results is dependent upon the accuracy of the satellite ephemerides. Satellite ephemerides errors propagate in a 1:1 proportion into geoposition errors in such geolocation methods.

Figure 5B:
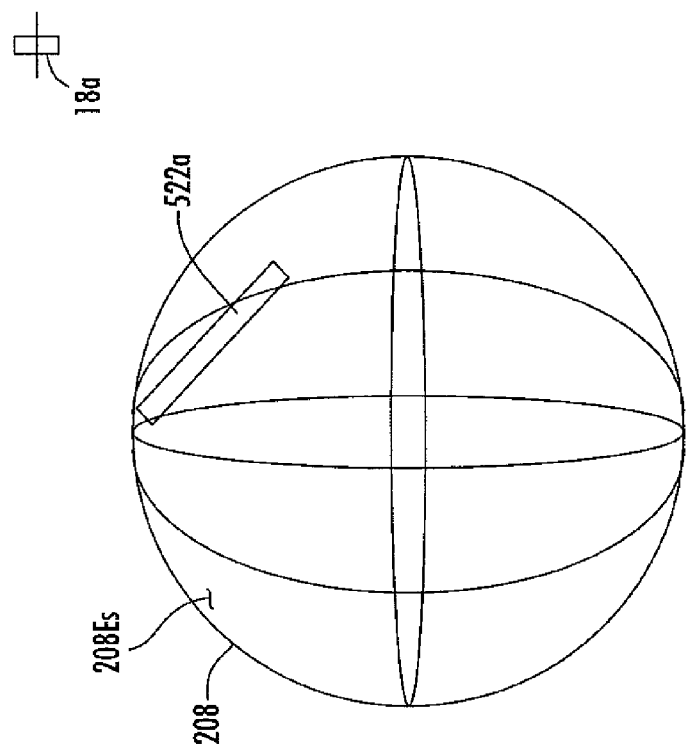
FIG. 5B is a perspective or isometric illustration of the corresponding error track across a portion of the Earth's surface.

FIGS. 5A, 5B, 5C, and 5D together constitute a notional illustration of the principles of geolocation according to aspects of the disclosure. Image plane 510 of FIG. 5A of telescope/EOD/EOS of an observer includes an image 512a. Image 512a shows a star field including a plurality of stars and also includes a notional "streak" representation of the position of a satellite 518a together with the uncertainty in its position which may be attributable to old or outdated ephemerides. It should be emphasized that the image 512a of FIG. 5A will not actually show the uncertainty in the position of the satellite, it will simply show the satellite at some position within the notional "streak" 518a. Streak 518a illustrated in FIG. 5A notionally represents a distribution of possible satellite positions 518a which exist at the time of the image. As illustrated in FIG. 5A, the errors in the satellite's position are for the most part in the along-track direction, so it is easy to conceptually mistake the illustrated ephemerides error as representing a streak due to satellite motion during the imaging interval. In FIG. 5A, the elongation of possible locations 518a represents the positional uncertainty. The point is that the ephemerides error in the along-track direction is known to be much larger than in the cross-track dimension. The significance of this fact is set forth below. Two of the stars in the star field of FIG. 5A are illustrated as 220a and 220d. FIG. 5B illustrates an elongated error track 522a traced on the Earth's surface 208Es. Error track 522a represents possible observer positions when the satellite 18a ephemerides update data set is or are old. Error track 522a may be as 5 kilometers (km) in length for a 12-hour old ephemerides data set.

FIG. 5C illustrates an elongated track 518b representing the distribution of possible positions of a second satellite 18b imaged in a second EOS (or in the same EOS at a different time). As with the case of FIG. 5A, (and reproduced as FIG. 5E), the errors in the track of second satellite 18b are for the most part in the along-track direction. Note that the possible locations 518b due to uncertainty in the location of the second satellite is not in the same direction as the distribution 518a of FIG. 5A. This means that the tracks of the two satellites intersect at some point in an image common to both, or in an extension of that image. Two of the stars in the star field are imaged as 220b and 220c. As may be understood by comparing FIGS. 5E and 5C, the direction of motion of the satellite (18a) imaged in the EOS of FIG. 5E and the direction of motion of the satellite (18b) imaged in the EOS of FIG. 5C are not parallel, in that their possible-location streaks 518a and 518b include mutually orthogonal components. More particularly, the streak tracks in FIGS. 5E and 5C are substantially at right angles. FIG. 5D illustrates elongated error tracks 522a and 522b of satellites 18a and 18b traced out on the surface 208Es of the Earth 208. These error tracks arise where the satellite ephemerides are not well known or the update is stale. As mentioned, the cross-track errors in the tracks 522a and 522b are smaller than the along-track errors. The juncture or crossing of error tracks 522a and 522b identifies the true geolocation with greater accuracy than can be derived from either of the tracks taken alone. The extended angles-only method according to aspects of the disclosure combines information or images of multiple satellites to achieve better accuracy than prior-art methods, and, depending upon the direction of motion and number of the satellites available for imaging, this improvement in accuracy may be by an order of magnitude.

Figure 6A:
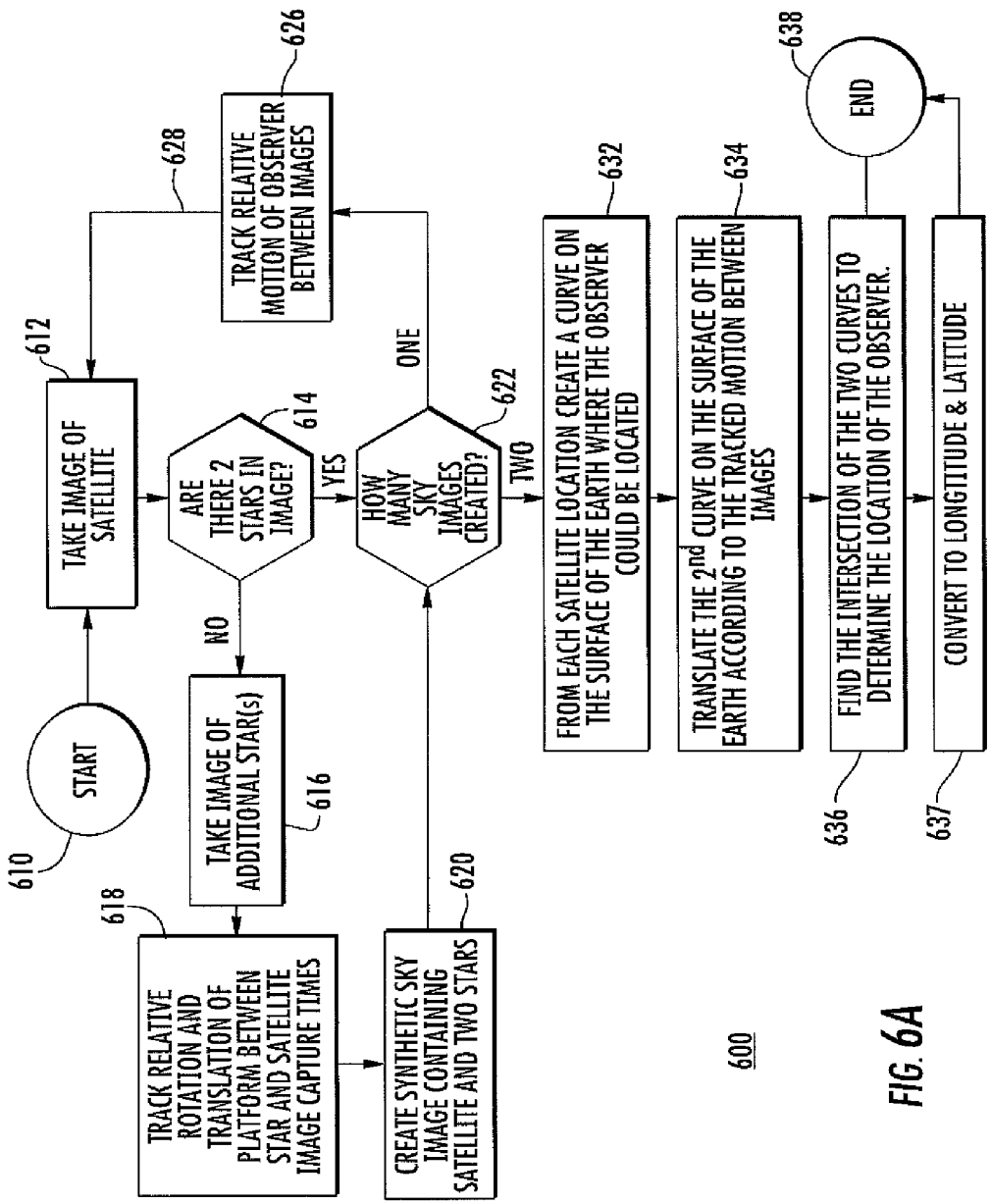
FIG. 6A is a simplified logic flow chart or diagram illustrating steps, including computer steps, according to aspects of the disclosure, for processing satellite and star image information from multiple satellite and star sightings to determine the geolocation of the observer, FIG. 6B notionally represents a first sky image containing one satellite and one star.
Figure 6C:
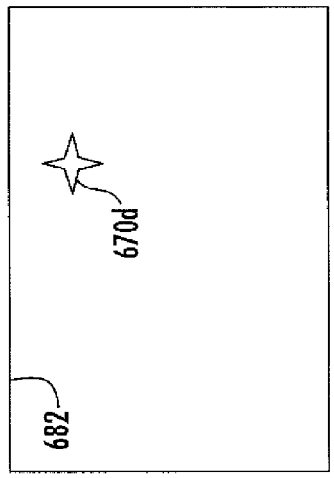
FIG. 6C represents a second sky image displaced by known angles from the first sky image and including at least a star.
Figure 6E:
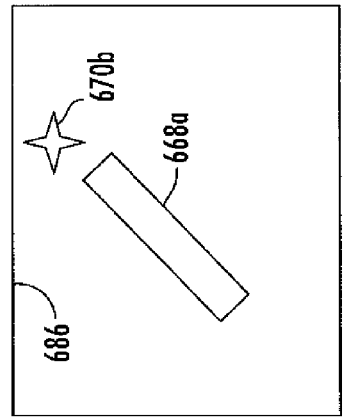
FIG. 6D represents a synthetic sky image containing the satellite and one star of FIG. 6B and the star of FIG. 6c, FIG. 6E notionally represents a sky image displaced by known angles from the other synthetic sky images and including at least a second satellite and a star.
FIG. 6F represents a sky image displaced by known angles from the other sky images and including at least a further star.
FIG. 6G is a notional synthetic sky image including the satellite and star of FIG. 6E and the star of FIG. 6F.
FIG. 6H is a simplified logic flow chart or diagram illustrating method or logic flow for determining observer geolocation when two satellites with accurate ephemerides can be imaged, and FIG. 6I sets forth mathematics for calculating position from two sky images or two synthetic sky images.
FIG. 6J is a simplified flow chart or diagram illustrating logic flow according to an aspect of the disclosure, for use when accurate satellite ephemerides are available.
Figure 6B:
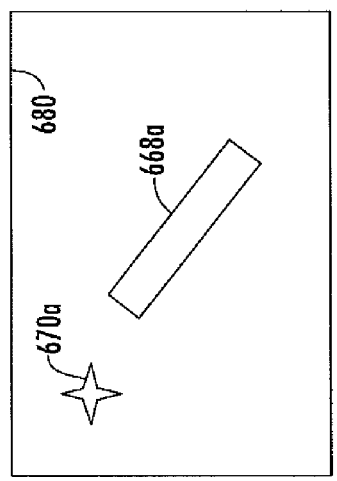

FIG. 6A is a simplified flow chart 600 illustrating steps, including computer steps, according to aspects of the disclosure for the case in which there are two images, each including a satellite and two stars. This method is used when the along-track portion of the ephemerides of the satellites is or are not well known. The logic of FIG. 6A begins at a START block 610, and flows to a block 612. Block 612 represents the generation of a first image (or its data equivalent) of a first satellite (such as 18a) with at least one star (such as 20a) included in the image. This is accomplished by the use of EOS 16 of FIG. 1. FIG. 6B illustrates a notional example of such an image, including an image 670a of a star 20a and an elongated track 668a representing possible positions of satellite 18a. The logic 600 of FIG. 6A flows from block 612 of FIG. 6A to a decision block 614. Decision block 614 represents examination of the first image 680 to determine how many stars are present or imaged in the star field accompanying the image of the satellite(s). Methods for examination of the image of a star field are well known in the art, and require no further explanation. Thus, decision block 614 determines if there are at least two stars in the image 680, which image may be, for example, that of FIG. 6B. If there are not two stars, the logic leaves decision block 614 by the NO output, and flows to a block 616. If there are two stars in the image, the logic leaves decision block 614 by the YES output.

There is no requirement that the satellites which are selected for viewing have paths that actually cross. This is because the calculated curves of the observer's location from the two synthetic sky images will always intersect.

Figure 6D:
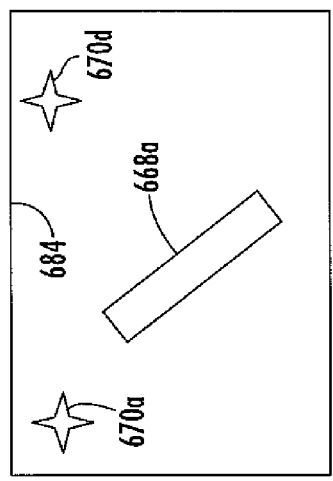

Upon leaving decision block 614 by the NO output, logic 600 of FIG. 6A arrives at a block 616. Block 616 represents the generation of an image of one or more additional stars. The image 682 of FIG. 6C represents the second image, and includes a second star illustrated as 670d. The satellite information (and any star information) from the first image 680 may be taken or derived at a different moment by comparison with the information of the second image, so that in order to combine the information from first image 680 with that of second image 682 it is necessary to track the rotation and translation of the platform in the interval between the images 680 and 682. If multiple EOS devices are used to generate both the first and second images, the first and second images can be made simultaneously, and only relative spatial orientation (azimuth and elevation) of the two EOS devices or imaging arrangements is needed to allow combining of the image information. The tracking of the spatial information and, if appropriate, the timing information, is represented in FIG. 6A by block 618. From block 618, the logic 600 flows to a block 620, which represents the generation of a first synthetic sky image containing at least one satellite and two stars from the information of the first and second images 680 and 682. FIG. 6D represents the first synthetic sky image generated from the images 680 and 682 of FIGS. 6B and 6C, respectively, and from the known relative azimuth and elevation of the images of FIGS. 6B and 6C. From block 620 of FIG. 6A, the logic 600 flows to a decision block 622.

Either from block 620 or directly by way of the YES output of decision block 614, the logic 600 of FIG. 6A will arrive at decision block 622. Block 622 determines how many synthetic sky images have been created as a result of the preceding iterations through the logic 600 and during the current iteration through the logic 600. If only one synthetic sky image has been created, the logic leaves decision block 622 by the ONE output, and flows to a block 626. Block 626 represents the tracking of the relative motion of the observer between successive images. As mentioned, it is possible to use multiple imagers operated simultaneously to obviate inter-image spatial tracking requirements, leaving only the EOS-to-EOS pointing to be established. From block 626, the logic 600 flows by way of a logic path 628 back to block 612, representing the taking of an image of a satellite, such as satellite 18b, other than the satellite 18a which was imaged during the first iteration. FIG. 6E represents the image 668b of the possible locations resulting from notional imaging the second satellite 18b. The image of FIG. 6E includes a star designated 670b. If only one star is available in the image of FIG. 6E, a further image is generated, at known azimuth and elevation relative to the image of FIG. 6E, which further image contains at least one star. This further image is illustrated in FIG. 6F, in which the star is designated 670c.

Figure 6G:
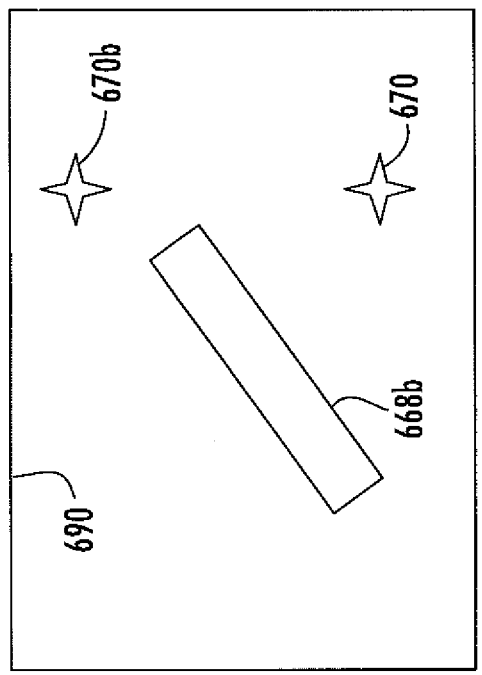
Figure 6F:
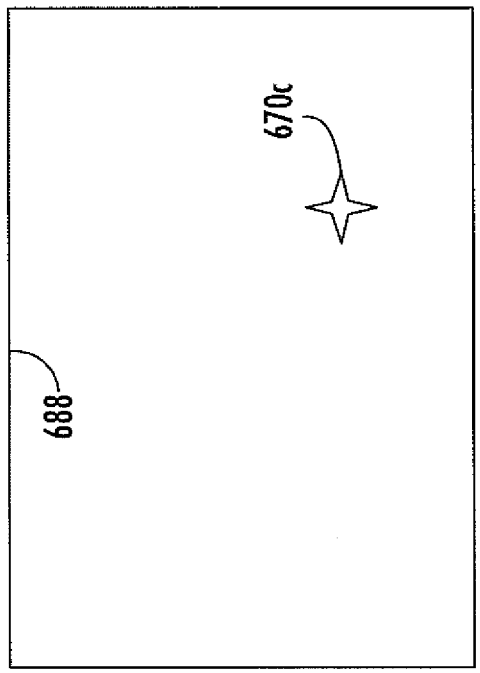

The logic 600 of FIG. 6A proceeds once again through decision block 614, and through blocks 616, 618, and 620 to generate a second synthetic sky image containing two stars and the notional possible locations of a satellite, represented in FIG. 6G. When the logic reaches decision block 622, two synthetic sky images are available, namely the synthetic sky images of FIGS. 6D and 6G. There being two synthetic sky images available, the logic 600 leaves decision block 622 by the "TWO" output. From the TWO output of decision block 622, the logic 600 reaches a block 632. Block 632 represents the calculation of a curve of possible observer locations from the satellite location. Since there are two synthetic sky images, each showing one satellite, two curves of possible position of the observer on the Earth's surface are determined.

Block 632 of FIG. 6A represents the calculation of possible observer locations corresponding to locations at which the satellites are visible. The mathematics associated with block 632 of FIG. 6A corresponds to calculation steps 100 through 160 in FIG. 6H, steps 250 to 290 of FIG. 8, and steps 322 through 330 of FIG. 6I. More particularly, when two images or synthetic sky images are available, the method includes starting at step 322 as illustrated in FIG. 6I, and proceeding to step 323. Step 323 represents performing the steps 100-290 of FIGS. 6H and 8 to determine the equation for all possible positions resulting from the first synthetic sky image.

$$X_1^{ECEF}(\alpha) = U_1^{ECEF}(t_0+\alpha) - C_1(\alpha) U_{1\,from\,Ship}^{ECEF} \quad (323)$$

where $\alpha$ is a scalar.
From step 323, the method of FIG. 6I proceeds to a step 324, which represents, performing the steps 100-290 of FIGS. 6H and 8 to determine the equation for all possible positions resulting from the second synthetic sky image.

$$X_2^{ECEF}(\beta) = U_2^{ECEF}(t_0+\beta) - C_2(\beta) U_{2\,from\,Ship}^{ECEF}, \quad (324)$$

where $\beta \in R^3$
The method proceeds from step 324 to a step 330, which represents solving equations 323 and 324 to identify the equation for line of possible positions on the surface of the earth resulting from the first and second synthetic sky images.

The logic 600 of FIG. 6A flows from block 632 to a block 634. Block 634 represents the translation of one of the curves of possible positions on the surface of the earth onto the other, in accordance with the tracked motion between image times. This step will be apparent to those skilled in the art, and requires no further explanation. This results in two superposed curves on the Earth's surface. Block 636 represents the calculation of the intersection of the two curves to determine the location of the observer. This step is performed in accordance with step 350 of FIG. 6I, which represents determining the scalar value of $\tau_1$ and $\tau_2$ such that $X_1^{ECEF}(\tau_1) = X_2^{ECEF}(\tau_2)$
Block 637 represents conversion of the intersection point to latitude and longitude. The logic 600 ends at an END block 638.

Figure 6J:
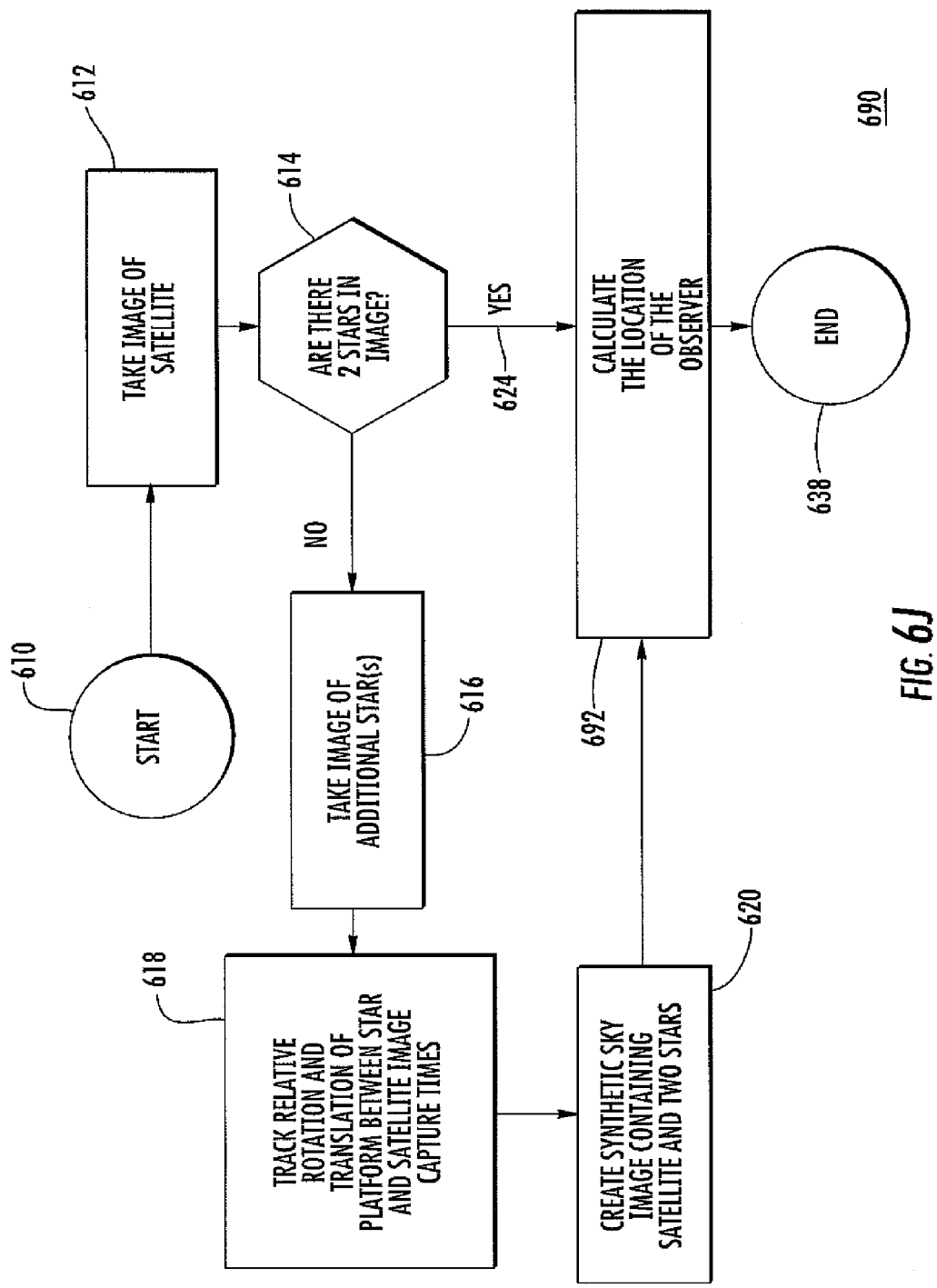

FIG. 6J is a simplified flow chart or diagram illustrating logic flow 690 according to an aspect of the disclosure, for use when accurate satellite ephemerides are available. That is, logic flow according to this aspect of the disclosure is for the situation in which both the along-track and cross-track portions of the satellite ephemerides is or are known to be accurate. Elements of FIG. 6J corresponding to those of FIG. 6A are designated by like reference alphanumerics. The logic starts at a start block 610, as described in conjunction with FIG. 6A, and flows to a block 612, which represents the making of an image of the satellite. From block 612, the logic flows to a decision block 614, which determines if there are two stars in the image. If there are not two stars in the image, the logic leaves decision block 614 by the NO output, and flows to a block 616. Block 616 represents the generation of additional images of stars, and block 618 represents the tracking of the relative rotation and translation between the obtainance of the first satellite/star image and the additional star image(s). Block 620 represents the creation of a synthetic sky image by combining the image information from multiple images, taking into account the relative position of the images. From block 620, the logic of FIG. 6J flows to a block 692. Block 692 represents the direct calculation of the observer's location from the single image or the synthetic sky image generated from plural images. This is accomplished using the mathematical steps 100 through 160 of FIGS. 6H and 250 to 310 of FIG. 8.

Figure 7:
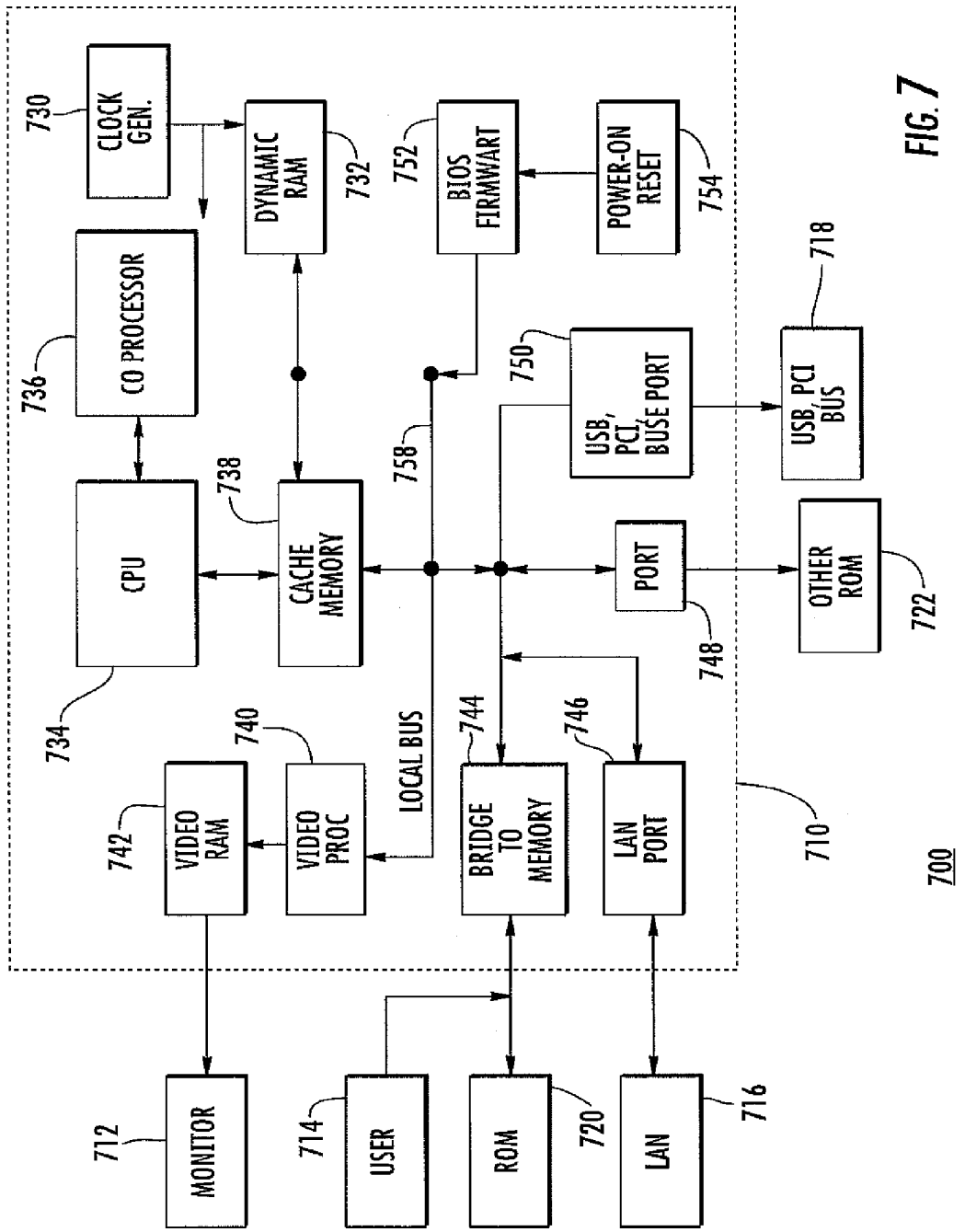
FIG. 7 is a simplified block diagram of a computer which may be used to perform the computer processing portions of the method according to aspects of the disclosure.

FIG. 7 is a simplified diagram in block and schematic form illustrating a representative computer 700 which may be used as 17 of FIG. 1. In FIG. 7, computer 700 includes a processor or board 710 and outboard elements such as a monitor 712, user controls such as a keyboard andor mouse, illustrated as a block 714, local area network (LAN) 716, additional buses 718 such as PCI andor USB, and read-only memory (ROM) 720, which is ordinarily a hard drive, and additional ROM 722, which may be, for example, a flash memory stick or capacitance disk (CD). The main portion of the computer processor or board 710 includes a central processing unit (CPU) 734, which communicates with a cache dynamic memory 738. At initial turn-on of the computer 700, a power-on reset illustrated as a block 754 enables a preloaded basic input/output system (BIOS) flash memory, which loads cache 738 with information that initializes the booting sequence by the CPU. When booted, CPU 734 may communicate with a coprocessor illustrated as 736, and also communicates with main dynamic memory (DRAM) 732 and a local bus 758. Local bus 758 provides communication between the CPU and other elements of the computer, as for example the video processor 740 and video random-access memory 742 for driving a monitor. Local bus 758 also communicates by way of a bridge 744 to external ROM 720 and to user controls 718. Local bus 758 further communicates by way of a port 748 with other ROM 722 if desired, by way of a USB or PCI bridge or port 750 with external buses, andor by way of a local area network (LAN) port 746 with a LAN 716. Those skilled in the art will understand how to use one or more computers to perform the processing required by elements of the disclosure. The various calculation steps may be viewed as being performed by processor portions or parts of the processor.

The achievable positional accuracy of the geoposition using a method according to an aspect of the disclosure is estimated to be 100 meters at one sigma from satellite ephemerides which are off by as much as 1 kilometer (km) along-track. This represents an improvement by as much as a factor of about ten (10) over the prior-art Belenkii satellite-based geoposition determination technique. The improvement arises from the inherent nature of the two methods. Belenkii uses a closed-form approach which uses a least-square-based triangulation in order to determine position from one measurement of a satellite and star. By contrast, according to aspects of the disclosure, images are taken of multiple satellites with each image containing, or compensated to contain, two or more stars. Low off-track errors (perpendicular to the satellite velocity) allow measurements along the satellite trajectory to be fairly accurate, regardless of the timing error.

What is claimed is:

1. A method for geoposition determination of longitude and latitude of a camera on a movable platform in the presence of at least one Earth satellite and first and second stars, said method comprising the steps of:
   obtaining, using the camera, a first image including the at least one earth satellite and the first and second stars;
   determining x and y positions of the at least one earth satellite and the first and second stars in the first image; and
   in a computer process, determining, from said determined x and y positions of said at least one earth satellite and said two stars-in said first image, a first set of possible locations of the camera in three-dimensional space, wherein said set of possible locations of the camera in three-dimensional space is determined by creating a curve mapped on a surface of the Earth, based on vectors measured in the first image from the camera to the first star, from the camera to the second star and from the camera to the at least one earth satellite.

2. A method for geoposition determination of longitude and latitude in the presence of at least one Earth satellite and two stars, said method comprising the steps of:
   observing x and y positions of the at least one earth satellite and first and second stars in a first camera image of a camera; and
   in a computer process, determining from said x and y positions of said at least one earth satellite and said two stars in said first camera image a first set of possible locations of the camera in three-dimensional space,
   wherein said step of determining includes the steps of:
   calculating a vector $S_1^{CAM}$ from the camera to the first star in a camera coordinate frame $$S_1^{CAM} = [\sin(x_1 P_x)\cos(y_1 P_y) \cos(x_1 P_x)\cos(y_1 P_y) \sin(y_1 P_y)]$$

where:
   $x_1$ is an x-axis location, in pixels, in a camera focal plane of the first star;
   $y_1$ is an y-axis location, in pixels, in the camera focal plane, of the first star;
   $P_x$ is the radians/pixel along the x-axis of the camera;
   $P_y$ is the radians/pixel along the y-axis of the camera;
   calculating a vector $S_2^{CAM}$ from the camera to the second star in the camera coordinate frame $$S_2^{CAM} = [\sin(x_2 P_x)\cos(y_2 P_y) \cos(x_2 P_x)\cos(y_2 P_y) \sin(y_2 P_y)];$$

where:
   $x_2$ is an x-axis location, in pixels, in the camera focal plane of the second star;
   $y_2$ is an y-axis location, in pixels, in the camera focal plane, of the second star;
   calculating a vector $U^{CAM}$ from the camera to the at least one earth satellite in the camera coordinate frame $$U^{CAM} = [\sin(x_U P_x)\cos(y_U P_y) \cos(y_U P_y) \sin(y_U P_y)];$$

where:
   $x_U$ is an x-axis location, in pixels, in the camera focal plane of the satellite;
   $y_U$ is a y-axis location, in pixels, in the camera focal plane, of the satellite;
   calculating a 3×3 matrix $M^{ECEF}$ representing an orthogonal vector triad of the first and second stars in an earth-centered, earth-fixed (ECEF) coordinate frame $$M^{ECEF} = [S_1^{ECEF} S_1^{ECEF} \times S_2^{ECEF} S_1^{ECEF} \times (S_1^{ECEF} \times S_2^{ECEF})]$$

where:
$S_1^{ECEF}$ and $S_2^{ECEF}$ are vectors extending from the center of the Earth to the first and second stars, respectively;
calculating a 3×3 matrix $M^{CAM}$ representing the orthogonal vector triad of the first and second stars in the camera coordinate frame $$M^{CAM} = [S_1^{CAM} S_1^{CAM} X S_2^{CAM} S_1^{CAM} X (S_1^{CAM} X S_2^{CAM})]$$

where:
$S_1^{CAM}$ and $S_2^{CAM}$ are vectors from the camera to the first and second stars in the camera coordinate frame, wherein cross product X in the above equation is a normalized cross product, defined as the unit vector in a direction of a cross product $$(U \times V)_i \equiv \frac{U_j V_k \varepsilon_{ijk}}{U_m V_n \varepsilon_{lmn} U_p V_q \varepsilon_{lpq}};$$

where:
U and V are arbitrary vectors and ε is a Levi-Civita symbol and i, j, k, l, m, n, p, q represent Cartesian coordinates as per Eisenstein notation convention;
calculating a 3×3 rotation matrix $R_{CAM}^{ECEF}$ from the camera coordinate frame to the ECEF coordinate frame $$R_{CAM}^{ECEF} = M^{ECEF}(M^{CAM})^T;$$

calculating a vector $U_{from\ ship}^{ECEF}$ from the camera to the at least one earth satellite in the ECEF coordinate frame by $$U_{from\ ship}^{ECEF} = R_{CAM}^{ECEF} U^{CAM}$$

where:
$U^{CAM}$ is a 3×1 vector from the camera to the at least one earth satellite in the camera coordinate frame;
calculating a vector $X^{ECEF}$ from the center of the Earth to the camera, in the ECEF coordinate frame, at the time the first camera image is or was taken, by $$X^{ECEF} = U^{ECEF} - CU_{from\ ship}^{ECEF}$$

where:
C is an unknown scalar; and
$U^{ECEF}$ is a vector to the at least one earth satellite from the Earth center, which is known from satellite ephemerides;
solving $X^{ECEF} = U^{ECEF} - CU_{from\ ship}^{ECEF}$ for a scalar value γ such that
Altitude $(X^{ECEF}(C=\gamma))=0$, and
substituting C=γ into $$X^{ECEF} = U^{ECEF} - CU_{from\ ship}^{ECEF}$$

to give $$X^{ECEF} = U^{ECEF} - \gamma U_{from\ ship}^{ECEF}$$

where:
r is the value of C that makes the expression Altitude $(X^{ECEF}(C=\gamma))=0$ true.

3. A method for geoposition determination of an imager on a movable platform in the presence of at least one Earth satellite and at least first and second stars, said method comprising the steps of:
observing said at least one Earth satellite and said first and second stars with the imager to produce a plurality of images, each of said images containing an image of at least said at least one Earth satellite or one of said first and second stars, and some of said images containing both the at least one satellite and said first and second stars;
in a computer process, determining the imager's motion in an interval between the observing of said at least one Earth satellite, the observing of said first star, and the observing of said second star;
from x and y coordinates of said at least one satellite and said first and second stars in said images, determining in a computer process, an azimuth and an elevation of said at least one Earth satellite and an azimuth and an elevation of each of said first and second stars at the imager's location;
in a computer process, converting said azimuths and said elevations of said at least one Earth satellite and said first and second stars to a common or local coordinate system fixed in time, to produce a synthetic sky image of the at least one Earth satellite and the first and second stars, wherein said synthetic sky image is constructed from multiple images based on known angular relationships and exposure times of the multiple images; and
in a computer process, determining, from said synthetic sky image, the location of the imager in three-dimensional space.

4. A method according to claim 3, further comprising the step of converting units of said location of the imager to latitude and longitude.

5. A method for geoposition determination of longitude and latitude of an imager on a movable platform in the presence of at least two Earth satellites, said method comprising the steps of:
observing x and y positions of a first one of the at least two Earth satellites and a first set of two stars in a first image taken with the imager;
observing x and y positions of a second one of the at least two satellites and a second set of two stars in a second image taken with the imager;
in a computer process, determining, from said first image, a first set of possible locations of the imager in three-dimensional space by mapping a curve on a surface of the Earth based on the position of the first one of the at least two Earth satellites and said first set of two stars;
in a computer process, determining, from said second image, a second set of possible locations of the imager in three-dimensional space by mapping a curve on a surface of the Earth based on the position of the second one of the at least two Earth satellites and said second set of two stars; and
in a computer process, locating an intersection of said first and second sets of possible locations, based on an intersection of the curves mapped to the surface of the Earth, said intersection being the location of the imager.

6. A method according to claim 5, wherein before said step of locating, further comprising the steps of:
in a computer process, determining said imager's motion in an interval between obtaining said first and second images; and
in a computer process, compensating said second set of possible locations for said motion.

7. A method according to claim 5, wherein said step of observing the x and y positions of said second one of the at least two Earth satellites and said second set of two stars in said second image includes the step of observing the x and y positions of two stars which are different from the stars of said first image.

8. A method for geoposition determination of an imager on a movable platform in the presence of at least first and second Earth satellites and at least first and second stars, said method comprising the steps of:

observing said at least first and second Earth satellites and said first and second stars with the imager, to produce a plurality of images, each of said images containing an image of at least one of said first and second Earth satellites or one of said first and second stars, and some of said images containing both of the first and second Earth satellites and said first and second stars;

from the x and y coordinates of said first and second Earth satellites and said first and second stars in said images, determining in a computer process an azimuth and an elevation of said at least first and second Earth satellites and said first and second stars at the imager's location, and converting said azimuth and elevation of said first and second Earth satellites and said first and second stars to a common or local coordinate system fixed in time, to produce a first and second synthetic sky image, each of at least one of said first or second Earth satellites and both of the first and second stars, wherein each of said first and second synthetic sky images are constructed from multiple images based on known angular relationships and exposure times of the multiple images;

in a computer process, determining, from said first and second synthetic sky images, a first and second set of possible locations of the imager in three-dimensional space; and deeming the intersection of said first and second sets of possible locations to be the location of the imager.

9. A method according to claim 8, further comprising the step of converting the units of said location of the observer to latitude and longitude.

10. A method for geoposition determination of an imager on a movable platform in the presence of at least two Earth satellites, said method comprising the steps of:

observing x and y positions of a first one of said two Earth satellites and a first star in a first image with the imager;

in a computer process, converting said x and y positions of said first one of said two Earth satellites and said first star in said first image to an azimuth and an elevation at the imager's location;

observing x and y positions of a second star in a second image;

in a computer process, converting said x and y positions of said second star in said second image to an azimuth and an elevation at the imager's location;

in a computer process, determining the imager's motion in a first interval between the observing of said first one of said two Earth satellites and said first star and the observing of the second star;

in a computer process, generating a first synthetic sky image from said motion of said imager during said first interval and from said azimuth and said elevation of said first one of said two Earth satellites, said first star and said second star; and observing x and y positions of a second one of said at least two Earth satellites and a third star in a third image;

in a computer process, converting said x and y positions of said second one of said at least two satellites and said third star in said third image to an azimuth and an elevation at the imager's location;

observing x and y positions of a fourth star in a fourth image;

in a computer process, converting said x and y positions of said fourth star in said fourth image to an azimuth and an elevation at the imager's location;

in a computer process, determining the imager's motion in a second interval between the observing of said second one of said at least two Earth satellites and said third star and the observing of said fourth star;

in a computer process, generating a second synthetic sky image from said motion of said imager during said second interval and from said azimuth and said elevation of said second Earth satellite, said third star and said fourth star;

in a computer process, determining, from said first synthetic sky image, a first set of possible locations of the imager in three-dimensional space;

in a computer process, determining, from said second image, a second set of possible locations of the imager in three-dimensional space; and in a computer process, locating an intersection of said first and second sets of possible locations, said intersection being the location of the imager.

11. A system for geoposition determination of longitude and latitude of an observer on a movable platform in the presence of at least one Earth satellite and first and second stars, said system comprising:

the observer observing x and y positions of said at least one Earth satellite and said first and second stars in a focal plane image; and a processor arrangement for determining, from said x and y positions of said at least one Earth satellite and said first and second stars in said focal plane image, a first set of possible locations of said observer in three-dimensional space, wherein said set of possible locations of the observer in three-dimensional space is determined by creating a curve mapped on a surface of the Earth, based on vectors measured in the first image from the camera to the first star, from the camera to the second star and from the camera to the at least one earth satellite.

12. A system for geoposition determination of longitude and latitude in the presence of at least one Earth satellite and first and second stars, said system comprising:

an observer for observing x and y positions of said at least one Earth satellite and said first and second stars in a focal plane image; and a processor arrangement for determining, from said x and y positions of said at least one Earth satellite and said first and second stars in said image, a first set of possible locations of said observer in three-dimensional space, wherein said observer comprises a camera and said processor arrangement includes:

a first processor portion for calculating the vector $S_1^{CAM}$ extending from said camera to the first star in a camera coordinate frame $$S_1^{CAM} = [\sin(x_1 P_x)\cos(y_1 P_y) \cos(x_1 P_x)\cos(y_1 P_y) \sin(y_1 P_y)]$$

where:

$x_1$ is an x-axis location, in pixels, in a camera focal plane of the first star $y_1$ is an y-axis location, in pixels, in the camera focal plane, of the first star;

$P_x$ is the radians/pixel along the x-axis of the camera focal plane;

$P_y$ is the radians/pixel along the y-axis of the camera focal plane;

a second processor portion for calculating the vector $S_2^{CAM}$ from said camera to the second star in said camera coordinate frame $$S_2^{CAM}=[\sin(x_2 P_x)\cos(y_2 P_y)\cos(x_2 P_x)\cos(y_2 P_y)\sin(y_2 P_y)];$$

where:
- $x_2$ is an x-axis location, in pixels, in the camera focal plane of the second star
- $y_2$ is an y-axis location, in pixels, in the camera focal plane, of the second star;
- $P_x$ is the radians/pixel along the x-axis of the camera focal plane;
- $P_y$ is the radians/pixel along the y-axis of the camera focal plane;

a third processor portion for calculating the vector $U^{CAM}$ extending from said camera to said satellite in said camera coordinate frame $$U^{CAM}=[\sin(x_U P_x)\cos(y_U P_y)\cos(x_U P_x)\cos(y_U P_y)\sin(y_U P_y)];$$

where:
- $x_U$ is an x-axis location, in pixels, in the camera focal plane of the satellite;
- $y_U$ is an y-axis location, in pixels, in the camera focal plane, of the satellite;

a fourth processor portion for calculating a 3×3 matrix $M^{ECEF}$ representing the orthogonal vector triad of said first and second stars in Earth-centered Earth-fixed (ECEF) coordinate frame $$M^{ECEF}=[S_1^{ECEF} S_1^{ECEF} X S_2^{ECEF} S_1^{ECEF} X (S_1^{ECEF} X S_2^{ECEF})]$$

where:
$S_1^{ECEF}$ and $S_2^{ECEF}$ are vectors extending from the center of the Earth to the first and second stars, respectively;

a fifth processor portion for calculating a 3×3 matrix $M^{CAM}$ representing the orthogonal vector triad of the first and second stars in the camera coordinate frame $$M^{CAM}[S_1^{CAM} S_1^{CAM} X S_2^{CAM} S_1^{CAM} X (S_1^{CAM} X S_2^{CAM})]$$

where:
$S_1^{CAM}$ and $S_2^{CAM}$ are vectors from the ship to the first and second stars in said camera coordinate frame, wherein cross product X is a normalized cross product, defined as the unit vector in a direction of a cross product expressed as:

$$(U \times V)_i \equiv \frac{U_j V_k \varepsilon_{ijk}}{U_m V_n \varepsilon_{lmn} U_p V_q \varepsilon_{lpq}};$$

where:
U and V are arbitrary vectors and c is a Levi-Civita symbol and i, j, k, l, m, n, p, q represent Cartesian coordinates as per Eisenstein notation convention;

a sixth processor portion for calculating a 3×3 rotation matrix $R_{CAM}^{ECEF}$ from said camera coordinate frame to said Earth-centered Earth-fixed ECEF coordinate frame $$R_{CAM}^{ECEF}=M^{ECEF}(M^{CAM})^T;$$

a seventh processor portion for calculating a vector $U_{from\ ship}^{ECEF}$ from said observer to said at least one Earth satellite in said Earth-centered Earth-fixed ECEF coordinate frame by $$U_{from\ ship}^{ECEF}=R_{CAM}^{ECEF}U^{CAM}$$

where:
$U^{CAM}$ is a 3×1 vector from said observer to said at least one Earth satellite in said camera coordinate frame;

an eighth processor portion for calculating a vector $X^{ECEF}$ from the center of the Earth to said observer, in said Earth-centered Earth-fixed ECEF coordinate frame, at the time the first camera image is or was taken, by $$X^{ECEF}=U^{ECEF}-CU_{from\ ship}^{ECEF}$$

where:
C is an unknown scalar; and
$U^{ECEF}$ is a vector to said at least one Earth satellite from the Earth center, which is known from said satellite ephemerides;

a ninth processor portion for solving $X^{ECEF}=U^{ECEF}-CU_{from\ ship}^{ECEF}$ for a scalar value γ such that Altitude ($X^{ECEF}(C=\gamma))=0$, and for substituting C=γ into $$X^{ECEF}=U^{ECEF}-CU_{from\ ship}^{ECEF}$$

to give $$X^{ECEF}=U^{ECEF}-\gamma U_{from\ ship}^{ECEF}$$

where:
γ is the value of C that makes the expression Altitude ($X^{ECEF}(C=\gamma))=0$ true.

13. A system for geoposition determination of an observer on a movable platform in the presence of at least one Earth satellite and at least first and second stars, said system comprising:

the observer observing said at least one Earth satellite and said first and second stars, to produce a plurality of images in a camera focal plane, each of said images containing the image of said at least one Earth satellite or one of first and second stars, and some of said images containing images of both said at least one Earth satellite and said first and second stars;

a first processing portion for determining the motion of said observer in an interval between the time of generation of an image including said at least one Earth satellite, generation of a first image including said first star, and the generation of a second image including said second star;

a second processing portion for determining, from the x and y coordinates of said at least one Earth satellite and said first and second stars in said first and second images, the azimuth and elevation of said at least one Earth satellite and said first and second stars at the observer's location, and converting said azimuth and elevation of said at least one Earth satellite and said first and second stars to a common or local coordinate system fixed in time, to thereby produce a synthetic sky image, which synthetic sky image includes at least two of the first and second stars and one at least one Earth satellite, wherein said synthetic sky image is constructed from multiple images based on known angular relationships and exposure times of the multiple images; and a third processing portion for determining, from said synthetic sky image, the location of the observer in three-dimensional space.

14. A system according to claim 13, further comprising:
a fourth processing portion for converting the units of said location of the observer to latitude and longitude.

15. A system for determination of longitude and latitude of an observer on a movable platform in the presence of at least two Earth satellites, said system comprising:

the observer observing x and y positions of a first one of said at least two Earth satellites and of a first and second star in a first image and for observing x and y positions of a second one of said at least two Earth satellites and a third and fourth star in a second image;

a first processing portion for determining, from said first image, a first set of possible locations of the observer in three-dimensional space by mapping a curve on a surface of the Earth based on the position of the first one of the at least two Earth satellites and said first and second stars;

a second processing portion for determining, from said second image, a second set of possible locations of the observer in three-dimensional space by mapping a curve on a surface of the Earth based on the position of the first one of the at least two Earth satellites and said third and fourth star; and a third processing portion for locating an intersection of said first and second sets of possible locations, based on an intersection of the curves mapped to the surface of the Earth, said intersection being the location of the observer.

16. A system according to claim 15, further comprising:

an fourth processing portion for determining said observer's motion in an interval between obtaining said first and second images; and a fifth processing portion for compensating said second set of possible locations for said motion.

17. A system for geoposition determination of an observer on a movable platform in the presence of at least first and second Earth satellites and at least first and second stars, said system comprising:

the observer observing said at least first and second Earth satellites and said at least first and second stars with an imager, to produce a plurality of images, each of said images containing an image of at least one of said at least first and second Earth satellites or one of said at least first and second stars, and some of said images containing images of both of said at least first and second Earth satellites and said first and second stars;

a first processing portion for determining an azimuth and an elevation of said at least first and second Earth satellites and an azimuth and an elevation of each of said first and second stars at a location of said observer, and for converting said azimuths and said elevations of said at least first and second Earth satellites and said azimuths and said elevations of said first and second stars to a common or local coordinate system fixed in time, to produce first and second synthetic sky images, each of said first and second synthetic sky images including at least two of the first and second stars and one of the at least first and second Earth satellites, wherein each of said first and second synthetic sky images are constructed from multiple images based on known angular relationships and exposure times of the multiple images;

a second processing portion for determining, from said first and second synthetic sky images, first and second sets of possible locations of said observer in three-dimensional space; and a third processing portion for locating an intersection of said first and second sets of possible locations, said intersection being the location of said observer.

18. A system according to claim 17, further comprising a fourth processing portion for converting units of said location of said observer to latitude and longitude.

19. A system for geoposition determination of an observer on a movable platform in the presence of at least two Earth satellites, said system comprising:

the observer in a first location for observing x and y positions of a first one of said at least two Earth satellites and a first star in a first image;

a first processor portion for converting said x and y positions of said first one of said at least two Earth satellites and said first star in said first image to a first azimuth and a first elevation at said first location of said observer;

said observer for observing at a second location x and y positions of a second star in a second image;

a second processor portion for converting said x and y positions of said second star in said second image to a second azimuth and a second elevation at said second location of said observer;

a third processor portion for determining the observer's motion in a first interval between the observing of said first one of said at least two satellites and said first star and the observing of the second star;

a fourth processor portion for generating a first synthetic sky image from said motion of said observer during said first interval and from said first azimuth and said first elevation of said first one of said at least two Earth satellites, said first star and said second star; said observer for observing at a third location x and y positions of a second one of said at least two Earth satellites and a third star in a third image;

a fifth processor portion for converting said x and y positions of said second one of said at least two satellites and said third star in said third image to a third azimuth and a third elevation at said third location;

a sixth processor portion for determining the observer's motion in a second interval between the observing of said second star and observing of said second one of said at least two Earth satellites and said third star;

said observer for observing at a fourth location x and y positions of a fourth star in a fourth image;

a seventh processor portion for converting said x and y positions of said fourth star in said fourth image to a fourth azimuth and a fourth elevation at said fourth location;

a eighth processor portion for determining the observer's motion in a third interval between the observing of said second at least one Earth satellite and said third star and the observing of the fourth star;

a ninth processor portion for generating a second synthetic sky image from said motion of said observer during said second interval and from said third azimuth and said third elevation of said second one of said at least two Earth satellites, said third star and said fourth star;

a tenth processor portion for determining, from said first synthetic sky image, a first set of possible locations of the observer at said first location in three-dimensional space;

an eleventh processor portion for determining, from said second image, a second set of possible locations of the observer at said first location in three-dimensional space; and a twelfth processor portion for locating an intersection of said first and second sets of possible locations, said intersection being said first location of the observer.

20. The system of claim 11, wherein the observer comprises an optical device fixed to an inertially stabilized trainable mount.

21. The method of claim 1, wherein said vector measurements are determined based on pixel coordinates of said first image.

22. The method of claim 3, wherein said determining the location of the imager from said synthetic sky image further comprises:
- determining vectors measured in said synthetic sky image, from the imager to the first star, the imager to the second star, and from the imager to the at least one earth satellite,
- wherein said vector measurements are based on pixel coordinates of the synthetic sky image.

* * * * *

UNITED STATES PATENT AND TRADEMARK OFFICE
CERTIFICATE OF CORRECTION

| | | |
|---|---|---|
| PATENT NO. | : 8,837,782 B1 | Page 1 of 1 |
| APPLICATION NO. | : 12/986661 | |
| DATED | : September 16, 2014 | |
| INVENTOR(S) | : Alan M. Rosenwinkel, Jonathan Mercurio and Kellie Bucha | |

It is certified that error appears in the above-identified patent and that said Letters Patent is hereby corrected as shown below:

Title page, item [75] Inventors, the second inventor's city should read "Moorestown".

Signed and Sealed this
Twenty-fifth Day of November, 2014

Michelle K. Lee
*Deputy Director of the United States Patent and Trademark Office*